(12) United States Patent
Braun et al.

(10) Patent No.: US 7,497,506 B2
(45) Date of Patent: Mar. 3, 2009

(54) END WALL MODULE

(75) Inventors: Marco Braun, Lug (DE); Steve Kober, Treuen (DE); Udo Becker, Sassenburg (DE); Ludovic Dejaeger, Wolfsburg (DE); Lars Bischoff, Brauschweig (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 398 days.

(21) Appl. No.: 10/530,097

(22) PCT Filed: Oct. 2, 2003

(86) PCT No.: PCT/EP03/10957

§ 371 (c)(1), (2), (4) Date: Jan. 3, 2006

(87) PCT Pub. No.: WO2004/056639

PCT Pub. Date: Jul. 8, 2004

(65) Prior Publication Data

US 2006/0162278 A1    Jul. 27, 2006

(30) Foreign Application Priority Data

Oct. 2, 2002  (DE) .............................. 102 46 994

(51) Int. Cl.
*B60R 21/04* (2006.01)

(52) U.S. Cl. .............. 296/191; 296/187.03; 296/187.05

(58) Field of Classification Search .................. 296/191, 296/187.03, 187.05, 39.1, 187.01, 187.12, 296/70, 208, 153, 146.7; 293/132, 133; 188/377; 280/748, 751

See application file for complete search history.

(56) References Cited

U.S. PATENT DOCUMENTS

| | | | | | |
|---|---|---|---|---|---|
| 3,933,387 | A | * | 1/1976 | Salloum et al. | 293/120 |
| 4,555,134 | A | * | 11/1985 | Gruna | 296/187.03 |
| 5,934,729 | A | * | 8/1999 | Baack | 296/39.1 |
| 6,752,450 | B2 | * | 6/2004 | Carroll et al. | 296/187.03 |
| 6,988,761 | B1 | * | 1/2006 | Stidham et al. | 296/186.1 |
| 7,052,077 | B1 | * | 5/2006 | Kalageros et al. | 296/191 |
| 7,097,234 | B2 | * | 8/2006 | Schonebeck | 296/187.03 |
| 7,201,434 | B1 | * | 4/2007 | Michalak et al. | 296/187.05 |
| 7,216,926 | B2 | * | 5/2007 | Hampel | 296/190.08 |
| 7,249,662 | B2 | * | 7/2007 | Itou | 188/377 |

FOREIGN PATENT DOCUMENTS

| | | |
|---|---|---|
| DE | 19946655 | 4/2001 |
| DE | 101435641 | 3/2003 |
| JP | 09/099868 | 4/1997 |
| JP | 10/203279 A | 8/1998 |

OTHER PUBLICATIONS

International Search Report dated Dec. 2, 2004.

* cited by examiner

*Primary Examiner*—Glenn Dayoan
*Assistant Examiner*—Gregory Blankenship
(74) *Attorney, Agent, or Firm*—Young Basile

(57) ABSTRACT

The invention relates to an end wall module for a transport vehicle. The inventive end wall module having a first wall and the second wall arranged at a distance therefrom. The first wall is embodied in the form of a first corrugated structure and the second wall is embodied in the form of a second corrugated structure. Said corrugated structures are embodied in such a way that they are distanced from each other when the end wall module is mounted without being deformed and are engaged into each other by the shape thereof when the end wall module is at least in the first deformation stage.

18 Claims, 10 Drawing Sheets

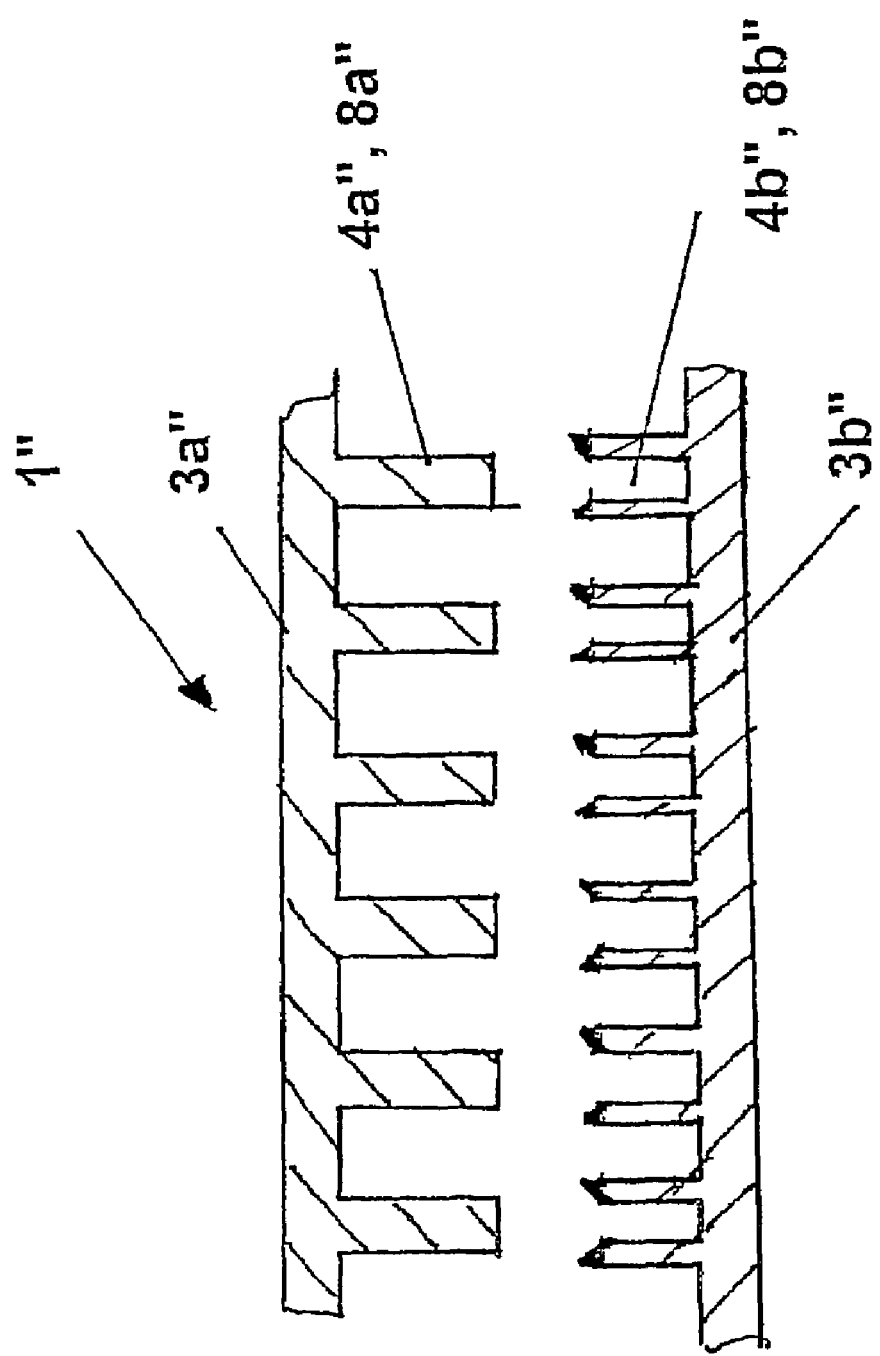

END WALL MODULE

BACKGROUND OF THE INVENTION

The present invention relates to an end wall module (also known as "front wall module" or "bulkhead module") for a motor vehicle wherein the end wall module includes a first wall spaced from a second wall.

End wall modules for motor vehicles are known in principle. The main function of such an end wall module is the separation of the motor space to the vehicle interior with motor vehicles. This end wall module in particular must meet the particular demands with modern high-quality motor vehicles. These demands on the one hand include a good sound insulation from the motor space to the motor vehicle interior and furthermore an as good as possible stiffening of the [car]body for reducing the torsional oscillation about the vehicle longitudinal axis. Despite these demands, the end wall module should only have a small weight.

It is known to provide end wall modules or end walls which at least in regions have a sandwich structure. I.e. that a first wall is provided as well as a second wall distanced to this. These walls are connected via a relatively "hard" foam layer.

This design, although ensuring a relatively high stiffness of the complete design, the properties with regard to the sound transmission however are inadequate. The relatively "hard" foam effects a direct structure-borne sound transmission of vibrations from the motor space into the vehicle interior. The provision of a relatively "soft" foam reduces the stability of the design, particularly in the case of a collision, to the extent that an inadequate protection of the vehicle occupants is given.

SUMMARY OF THE INVENTION

It is therefore the object of the present invention to provide an end wall module for motor vehicles which on the one hand is lightweight and on the other hand has very good sound insulation properties and well as offering an increased safety, particularly in the case of a crash.

An end wall module according to the independent claims achieves this object.

This object is achieved on account of the fact that a generic end wall module on the first wall comprises a first rib structure and on the second wall a second rib structure, wherein the ribs structures are formed such that in an undeformed installation condition of the end wall the first and second rib structure are distanced to one another (i.e. not directly in engagement) and in at least one deformed condition of the end wall module (e.g. in the case of a frontal crash with the bending of the end wall module), first and second ribs structures are engaged to one another with a positive fit.

A transmission of structure-borne sound via the rib structures is thus prevented due to their distancing. The airborne-sound transmission is interrupted by way of the cavity existing between the two walls. It is therefore ensured that on account of the double walling, on the one hand a good sound damping and sound insulation is effected (with an adequate torsional strength) and furthermore, in the case of a crash, due to the engagement of the rib structures, the geometrical moments of inertia increase greatly, in particular on bending, so that a penetration of components from the motor space into the vehicle interior may be prevented.

In the case of a force transmission (introduction) thus a bending of the cover layer proximal to the force occurs until the ribbing of both cover layers (walls) contacts one another. At the same time the rib structures are guided by way of a suitable contouring so that they do no slide past one another. After the ribs of both cover layers have come to "block", both cover layers are to be observed as one component which has a significantly higher bending stiffness on account of the Steiner component. In the normal case of application, both cover layers amongst one another have no contact so that a transmission of structure-borne sound may not occur. Thus an improvement of the acoustic properties, possible material saving, the combination of the advantages of a sound insulation with those of a sandwich system, additional energy absorption between foam possibly existing in the intermediate space and the inner-lying ribs etc. are to be mentioned as the advantages of the invention.

One further design of the end wall envisages components such as air-conditioning components or likewise being arranged on the first and/or second wall on the side which is distant to the respective other wall. By way of this, the mass is connected to the wall so that the wall together with these components act quasi as a "spring-mass system". Due to the rib structures which also increase the bending stiffness of the corresponding wall, the wall is stiffened so that bending oscillations within the wall itself may not occur. By way of the ribs structures therefore it is ensured that the whole wall (or a desired part) oscillates as a "unit" and by way of this the mass of the coupled components becomes quasi "acoustically effective". At the same time it is particularly advantageous if the weight of the appended components is larger than $2\ kg/m^2$ surface weight. In particular, on account of the stiffening in combination with the coupling of weight, the entire end wall may be seen as a spring-mass system and is therefore less prone to vibrations originating from the motor space. This measure may particularly render obsolete a so-called "heavy mat" (with 3.5 to 6 $kg/m^2$) whose single task is to increase the acoustically effective mass, which on the other hand however increases the consumption values of the motor vehicle on account of the otherwise unnecessary ballast.

A further advantageous formation envisages foam (such as polyurethane foam) or a cavity being arranged in the intermediate space between the first and second wall. In the case of a cavity which e.g. is to be terminated in an essentially airtight manner, the airborne sound transmission is reduced to a minimum. Furthermore the structure-born sound transmission is reduced on account of the absent connection of the rib structures to one another. The foam may either fill the complete intermediate space (in this case, a relatively "soft foam" should be selected in order to keep the transmission of structure-borne sound low).

A further advantageous design envisages the first and/or second rib structure comprising webs. These webs may either be "rod-like" and be aligned directed in a straight manner towards the respective other wall. However it is better if these webs (e.g. with a constant cross section) stand on the first or second wall projecting in a perpendicular manner over a larger length. By way of this it is ensured that this rib structure effects an increase in the stiffness or the walls. At the same time also the webs do not oscillate with respect to the wall so that no additional sound sources arise.

At the same time it is possible e.g. for the first rib structure to always have webs of the same length (i.e. in the spatial direction towards the second wall). In this case the webs run quasi "up to the middle line". By way of this the stiffness of both walls are designed relatively equally high.

It is however also possible for the first rib structure in each case to have a different length in the direction towards the second wall. By way of this, e.g. on production of the end wall module one succeeds in simplifying the insertion of a "foam curve". Furthermore e.g. by way of this "toothing" which is given in a complementary manner on the opposite wall, an even higher stability is ensured with shear stress of the end wall module.

One particularly advantageous design envisages the distance between the webs of a rib structure to be between 2 mm to 200 mm, preferably 4 mm to 25 mm.

One further particularly advantageous design envisages the webs on the surface facing the respective opposite wall (thus on their end face) to comprise curvatures and/or sharp bends in their running direction. By way of this, a quasi "multi-dimensional" design is achieved. On the one hand sharp bends or curvatures may be arranged in one spatial direction parallel to the plane of the wall surface (e.g. a zigzag course). On the other hand a sharp bending or curvature may exist perpendicular to the plane of the wall surface (this practically has the effect that the web with respect to the wall on which it is arranged, has different heights over its course). With curvatures or sharp bend one succeeds in achieving an event better "interlocking" of the opposite rib structures. At the same time it is evident that the sharp bends or curvature are complementary such that a positive fit of the opposite rib structures and a corresponding deformation is given.

It is advantageous for the webs of the first rib structure at their ends pointing to the second ribs structure to have a concave or convex shape. The webs which are complementary for this has a suitable complementary structure. The ends of the webs in cross section may converge in a pointed manner (e.g. in a triangular cross section) or be shaped with a spherical cross section.

Another possibility envisages the first rib structure comprising webs and the second rib structure cavities for accommodating these webs. The rib structures here are quasi designed as "triggers". A first rib structure presses into the opposite rib structure which e.g. centrally comprises a cavity up to the respective wall. With a crash, a rib structure provided with webs may plunge into the cavity of the opposite rib structure and at the same time accommodate energy. It is particularly advantageous if the webs with respect to corresponding cavities have a slight lateral overdimension so that the frictional work is accomplished on introduction into the cavities, which consumes crash energy. With this, the inner sides of the cavities or the outer sides of the webs may also be provided with a rough surface (micro-locking) or with corresponding large locking elements. By way of this one succeeds in providing a particularly firm joining of both walls after the compete penetration of the webs into the cavities, which is undetachable and whose geometrical moment of inertia is particularly high due to the non-displacability of the walls to one another.

One further advantages design envisages the smallest gap width between the first and the second rib structure being between 0.5 and 5 mm, preferably 1 mm to 2 mm. By way of this it is ensured that the structure-borne sound is not transmitted between the first and second wall even with slight vibrations of the first or second wall.

A further advantageous design envisages the area of the second wall on the side distanced to the first wall having 10%, preferably 20%, particularly preferably 30% more surface (area) than the first wall on its side distant to the second wall. This is particularly important if the end wall module is introduced into a mounting for bordering the end wall module which is provided in a motor vehicle [car] body. In this case the end wall module at least from one direction (e.g. from the vehicle interior) may be simply inserted into the end wall mounting. The overdimensioning with regard to area, of the second wall at the same time, on account of the contact surface with the end wall mounting ensures a particularly good strength (this in particular may be increased in that the end wall mounting is bonded to the end wall module and additionally screwed). Here it is particularly advantageous e.g. on the side of the second wall which is distant to the first wall to additionally provide stiffening (reinforcement) ribs in the region of the locally projecting surface share (part). By way of this one succeeds in the high acoustically effective mass of the second wall being effective up to the edge region of the second wall.

One particularly advantageous design envisages the first and/or second wall and/or the rib structures being of plastic or metal (here one should provide materials which have permanently temperature stability above 140° C.). It is advantageous for the wall and the rib structures to be of one piece. This permits e.g. a more favourable position given manufacture with the injection moulding method. Of course two-part designs are also possible. Metals or in particular plastics are considered as materials. Polypropylene, polyester (such as e.g. PET, PBT) polyamide or polyethylene are considered as plastics, all with 30 to 50% by weight of glass fibre share (component). Carbon fibres or aramide fibres may accordingly be added. The wall thickness of the first or second wall with plastic is preferably 1 to 6 mm, particularly preferred is 3 mm. The modulus of elasticity is 8000 to 12000 Megapascal.

BRIEF DESCRIPTION OF THE DRAWINGS

The invention is now explained in detail by way of several figures. There are shown in:

FIGS. 1a to 1c—various embodiments of an end wall module according to the invention, in cross section and in the undeformed condition, FIG. 2—an end wall module according to FIG. 1a in the deformed condition, FIG. 3a, a view of a motor vehicle [car]body with an end wall mounting, seen from the interior of the motor vehicle, 3b—a section according to A-A of FIG. 3a, FIGS. 4a-4c—a further embodiment form of an end wall module according to the invention, FIG. 5—a plan view of a rib-like honeycomb structure, FIG. 6—a section through a honeycomb according to FIG. 5, as well as FIG. 7—a further embodiment of a second wall of the end wall module.

DETAILED DESCRIPTION OF THE PREFERRED EMBODIMENT

Figure 1A:
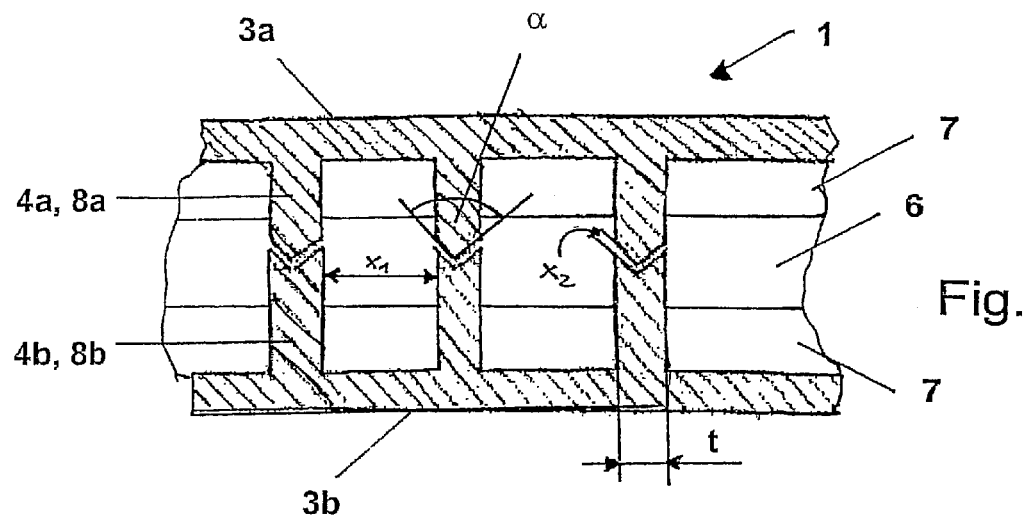

FIG. 1a shows a cutout of a cross section through an end wall module 1 for a motor vehicle. The end wall module comprises a first wall 3a as well as a second wall 3b distanced to this. The first wall 3a comprises a rib structure 4a. The second wall 3b has a second rib structure 4b.

The first rib structure 4a comprises webs 8a which in length extend in the direction perpendicular to the plane of the drawing. The first rib structure furthermore comprises stiffening webs 7 which cross with regard to this, on the first wall 3a. The webs 8a at their end pointing to the second wall 3b comprises triangular tips. The second wall 3b likewise comprises webs 8b which belong to the second rib structure 4b, as well as likewise stiffening webs 7 which cross with regard to this. These webs 8b at the end pointing to the first wall 3a have a shape which is complementary to the tips of the webs 8a and is likewise triangular in cross section, and specifically in the shape of a dent (convexity). A gap is present between the tips of the webs 8 as well as the receivers of the webs 8*b*, and is at least between 0.5 and 5 mm large.

The end wall module in FIG. 1*a* also exhibits foam regions 6. Here it is the case of polyurethane foam. For an even better sound insulation, the region between the first and the second wall may also be evacuated in regions.

Thus, with the end wall module according to FIG. 1*a* it is the case of an end wall module with a first and second wall and respective rib structures, wherein the rib structures are formed such that in the undeformed condition of the end wall module of installation shown in FIG. 1*a*, the first and second rib structure are distanced to one another. Later it will be discussed (see FIG. 2) how, given a bending load of the end wall module, the oppositely lying webs 8*a* and 8*b* of the rib structures become engaged with one another.

The distance between the individual webs 8*a* as indicated in FIG. 1*a* at $x_1$ is between 3 and 6 mm. The web width t to be selected depends on the distance $x_2$ and the angle $\alpha$ of the web tips. With $\alpha=90°$ as well as $x_2=1$ mm, the minimal web width t is preferably larger than 3 mm (all web pairs shown in FIG. 1*a* have identical dimensions).

Figure 1B:
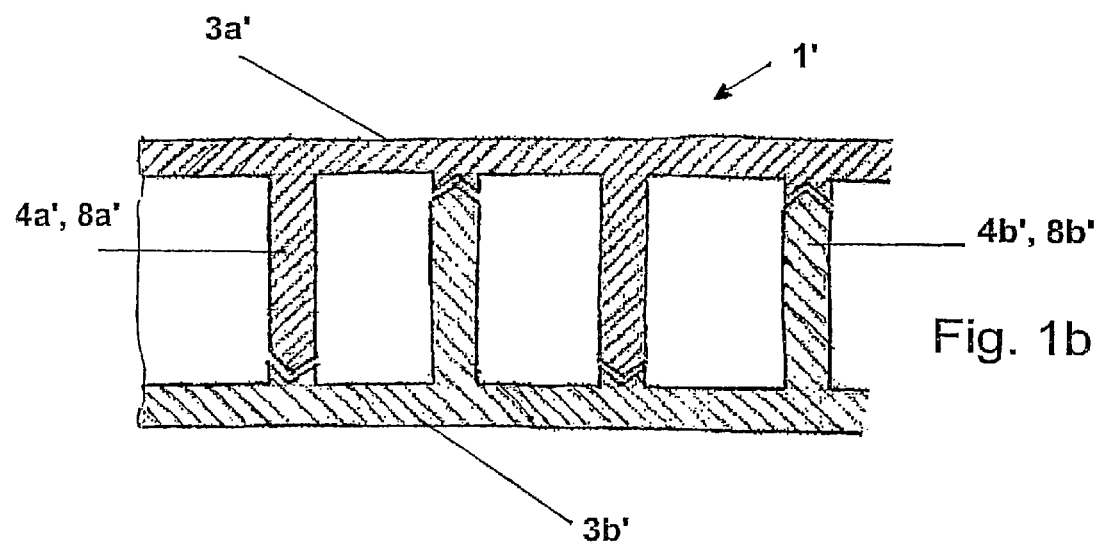

FIG. 1*b* shows an alternative embodiment form of an end wall module 1'. Here a first wall 3*a'* and a second wall 3*b'* are likewise shown. In contrast to the end wall module according to FIG. 1*a*, the webs 8*a'* of the first rib structure 4*a'*, in the direction perpendicular to the plane of the surface of the first wall 3*a'*, do not have the same length, but the webs, here in an alternating and changing manner have different web lengths. The same applies for the lengths of the webs 8*b'* of the second wall 4*b'*. This is necessary so that roughly the same gap widths exist between the respective web tips. Thus in FIG. 1*a* the first as well as the second rib structure in each case have webs with a length which is equal in the direction of the respective other wall. In FIG. 1*b* the first and second rib structure in each case comprise webs with a length which is different in the direction of the respective other wall.

A possibly present foaming in the intermediate space between the first wall 3*a'* and the second wall 3*b'* is not shown in FIG. 1*b*.

FIG. 1*c* shows a further embodiment form 1" of an end wall module according to the invention. This again comprises a first wall 3*a"* as well as a second wall 3*b"* The first wall 3*a"* comprises a first rib structure 4*a"* with webs 8*a"*. The second wall 3*b"* has a rib structure 4*b"*. The second rib structure 4*b"* comprises cavities 8*b"* for accommodating the webs 8*a"*. The webs 8*a"* or the ends of the edging of the cavities 8*b"* facing the webs may comprise run-in chamfers. The cavities 8*b"* have a smaller distance to one another than the width of the webs 8*a"* so that in the case of a penetration of the webs 8*a"* into the cavities 8*b"* on account of the overdimensioning, deformation work is accomplished which accommodates crash energy At the same time the corresponding surfaces in each case may be provided with a rough surface for ensuring a micro-locking, or also with corresponding locking lugs which prevent a separation of the first wall 3*a"* and 3*b"*.

Figure 2:
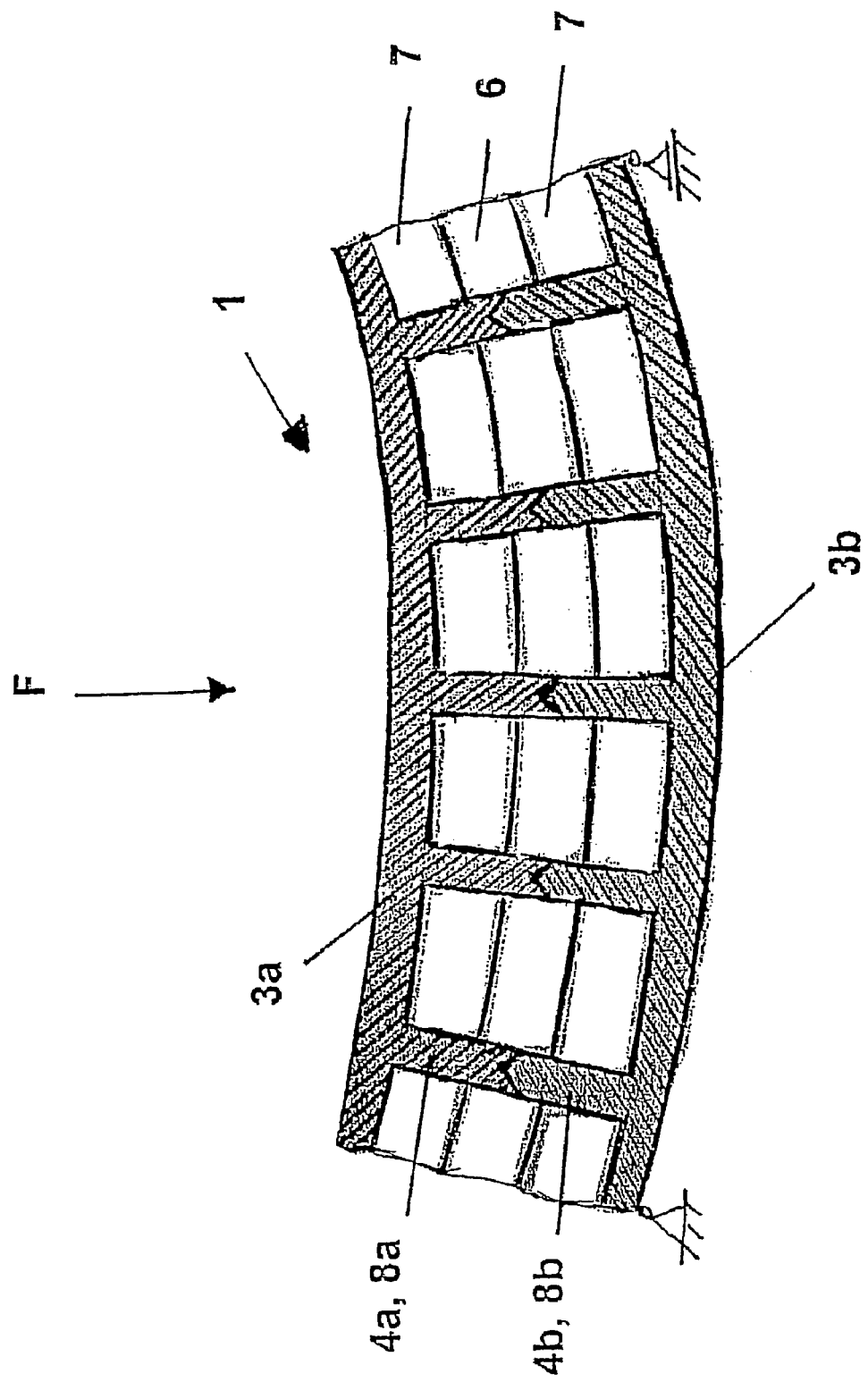

FIG. 2 shows the end wall module according to FIG. 1*a* in deformed condition. By way of exerting a bending force F, a bending of the end wall module 1 occurs, as would be the case with a frontal collision of the motor vehicle. By way of this the rib structures 4*a* as well as 4*b* with their webs 8*a* and 8*b* respectively engage (mesh) with one another. By way of this engagement, the bending stiffness of the end wall module is drastically increased, by which means a penetration of motor space components into the vehicle interior is prevented.

All of the end wall modules represented in the Figures have first or second walls of plastic. The wall and rib structure in each case form a single part as is evident from the hatching.

Figure 3A:
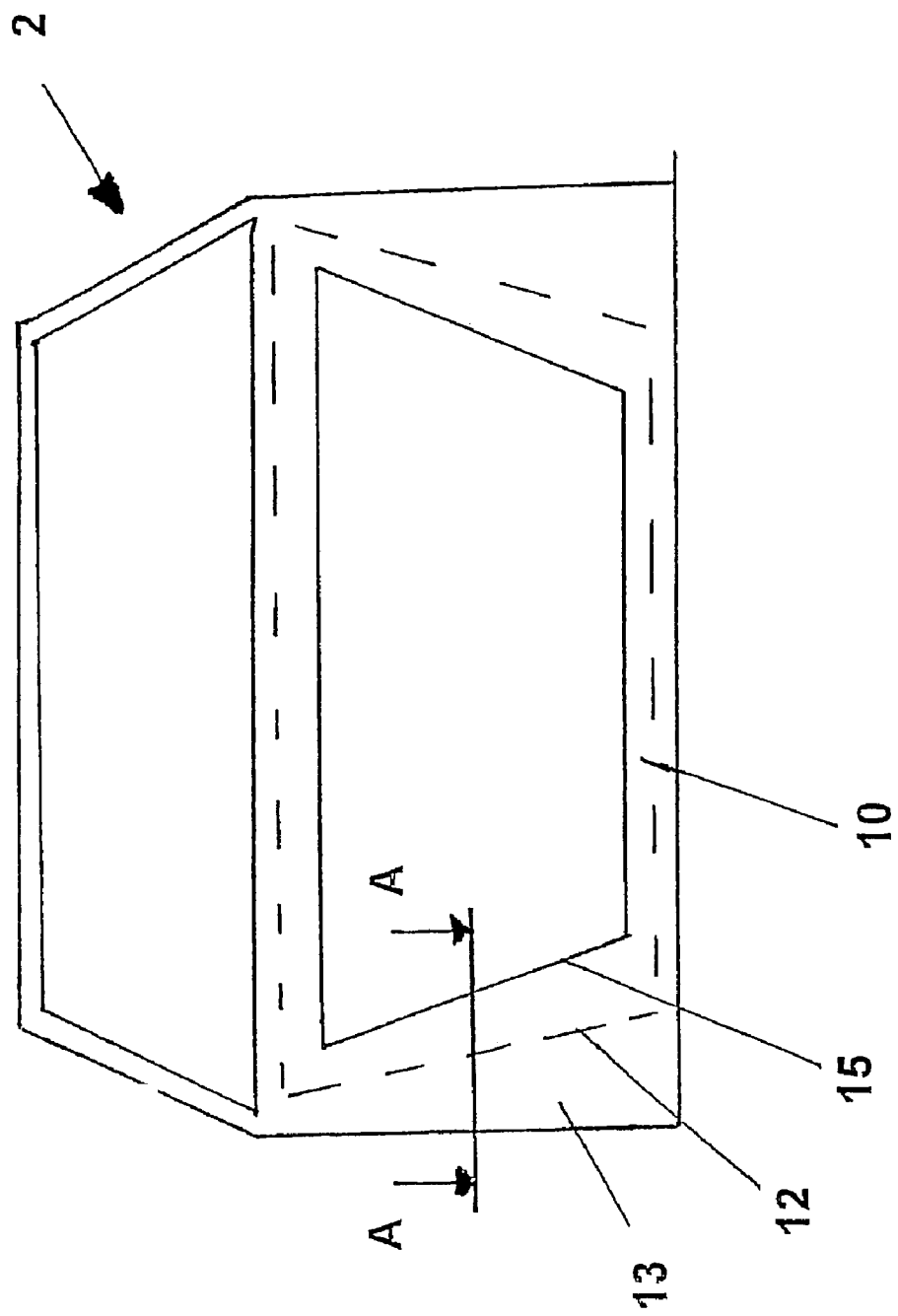

FIG. 3*a* shows a part of a motor vehicle 2, specifically the raw [car]body of a motor vehicle 2 from the interior. Here an end wall mounting may be recognised which in its inside comprises an end wall opening in which the end wall module 1 is assembled.

Figure 3B:
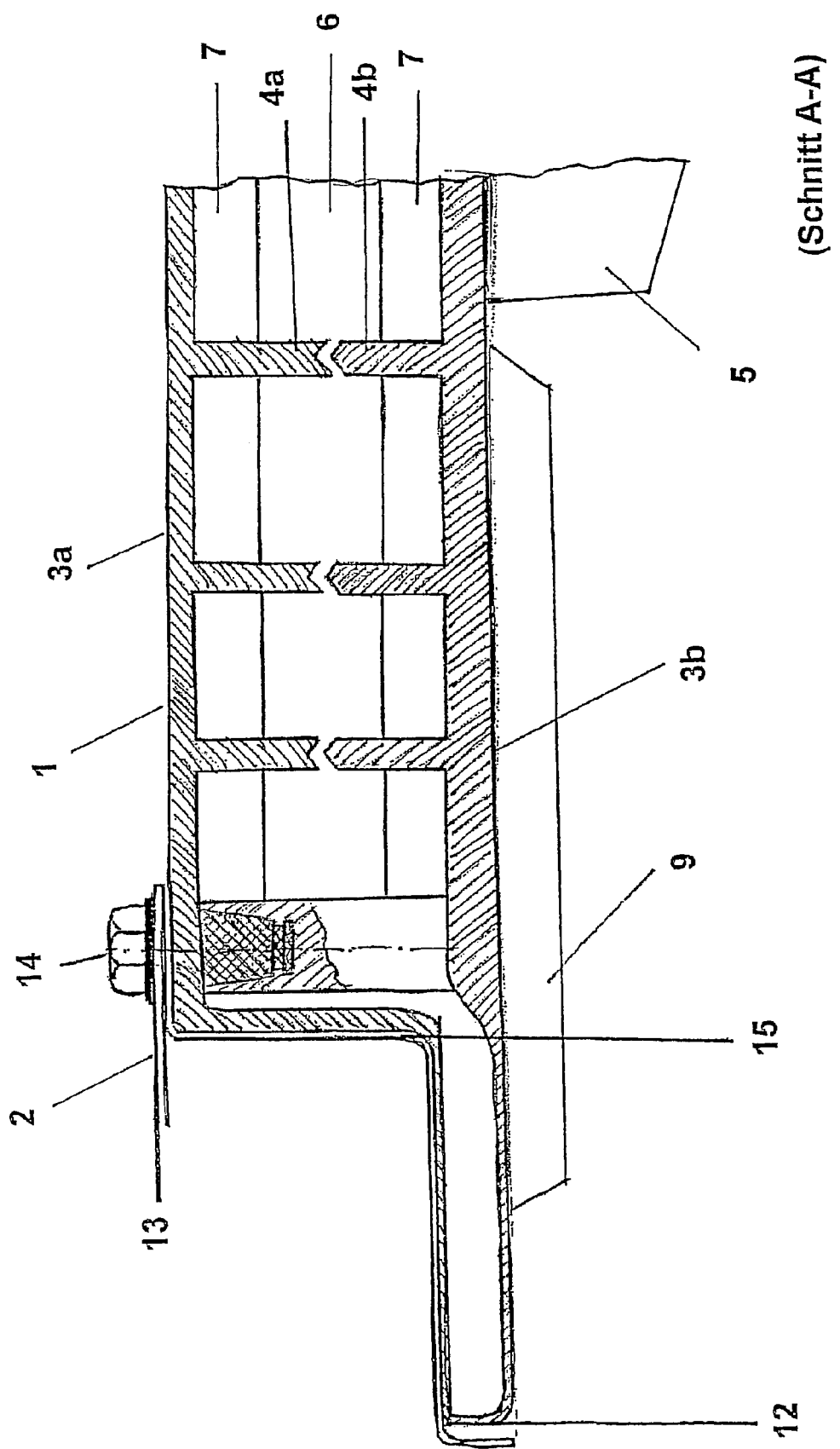

A section A-A is shown in FIG. 3*b*. In this, the end wall module is to be seen with its first wall 3*a* and its second wall 3*b*. Rib structures 4*a* and 4*b* as well as other components of the sandwich construction have already been explained above so that this is referred to in order to avoid repetitions. The end wall module is connected to a sheet metal structure 13 of the mounting 10 via screw connections 14. Apart from these screw connections, the end wall module 1 is also yet further connected to the sheet metal structure 13 in a large-surfaced manner via a bonding layer which has not been represented. The second wall 3*b* projects beyond the first wall 3*a* at the lateral outer edges. From FIGS. 3*a* and 3*b* it is evident that the outer edge of the first wall is indicated at 15 (continuous line in FIG. 3*a*) and the outer edge of the second wall at 12 (hatched line in FIG. 3*a*). The second wall projects beyond the first wall in total by 10% with regard to the surface.

The second wall on its side which is distant to the first wall 3*a* has an outer rib structure 9 which is continuous and reaches from the common overlapping region of the wall 3*a* and 3*b* (i.e. within the region 12 in FIG. 3*a*) up to into the edge region of the projecting region of the wall 3*b* (thus within the hatched line 15 in FIG. 3*a*). By way of this a stiffening of the second wall is achieved, in particular in this projecting region, by which means one succeeds in modelling the second wall e.g. as a whole (thus on its whole surface) as a unitary oscillating system. Furthermore components 5 such as e.g. parts of an air-conditioning installation are arranged on that outer side of the second wall 3*b* distant to the wall 3*a*. By way of this it is achieved that the mass of these air-conditioning installation parts which needs to be accommodated in the vehicle in any case, also further fulfils the additional task of rendering the second wall 3*b* heavier (the same is also additionally possible for the first wall 3*a*). Due to the ribs structures 4*b* or 9 therefore one succeeds in rendering the whole second wall quasi as a "single mass oscillator". Thus it is no longer necessary, as is the case with motor vehicles according to the state of the art, to furnish the whole region located within the dashed line 12 e.g. with heavy mat and creating unnecessary ballast on account of this.

Figure 4A:
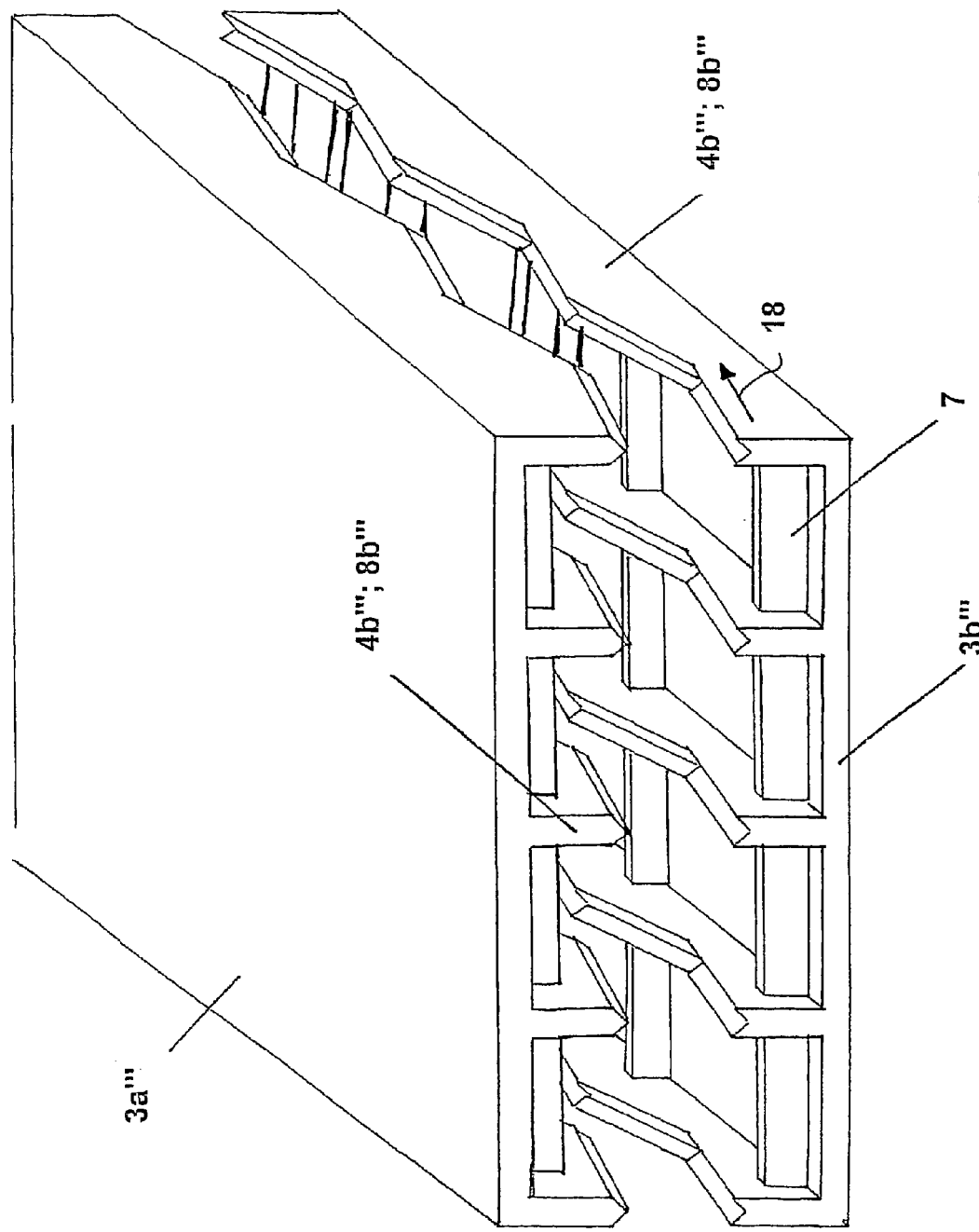
Figure 4C:
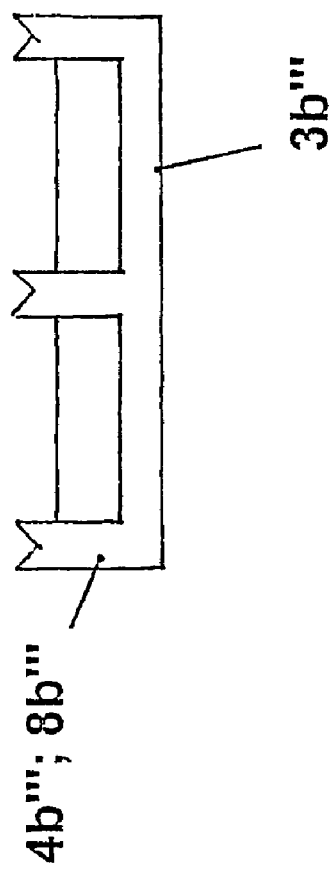
Figure 4B:
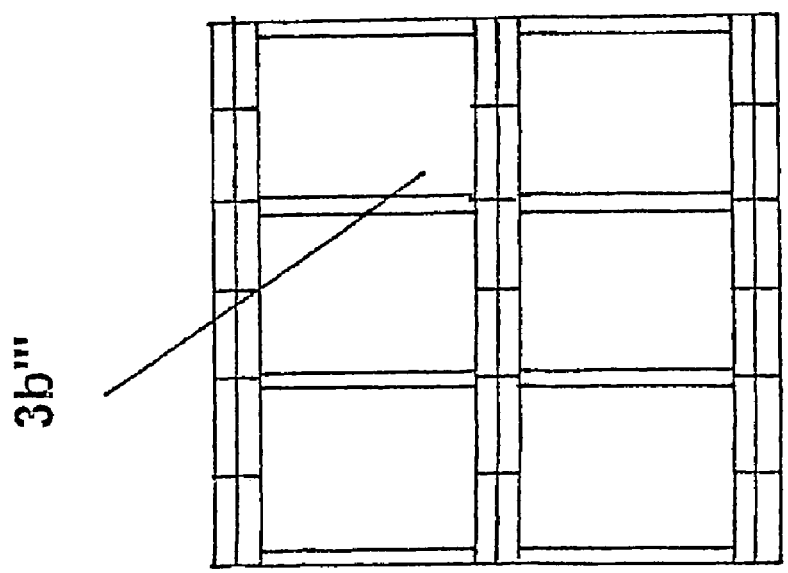

A further embodiment of an end wall module according to the invention is shown in FIG. 4*a* to 4*c*. Here a first wall 3*a'''* with a first rib structure 8*a'''* with webs 4*a'''* is shown. The second wall 3*b''''* comprises rib structures 4*b'''* with webs 8*b'''* between which stiffening webs 7 are arranged at right angles which however never contact the opposite stiffening webs 7. The webs 4*b'''* have sharp bends in their running direction 18. This arises due to the fact that the webs have different heights with respect to the plane of the wall surface of the wall 3*b'''* in the running direction. This height course leads to the fact that an even better meshing is given in the case of a collision (and even better prevention of the sliding between the first and second wall). Furthermore the geometry on foaming is advantageous since by of the low web heights, the foam starting material may travel more easily from chamber to chamber via the chambers limited by the stiffening webs 7 as well as the webs 4*b'''*.

FIG. 4*b* shows a plan view of the first wall 3*b'''*, and FIG. 4*c* shows a lateral view of the first wall 3*b"*.

Figure 5:
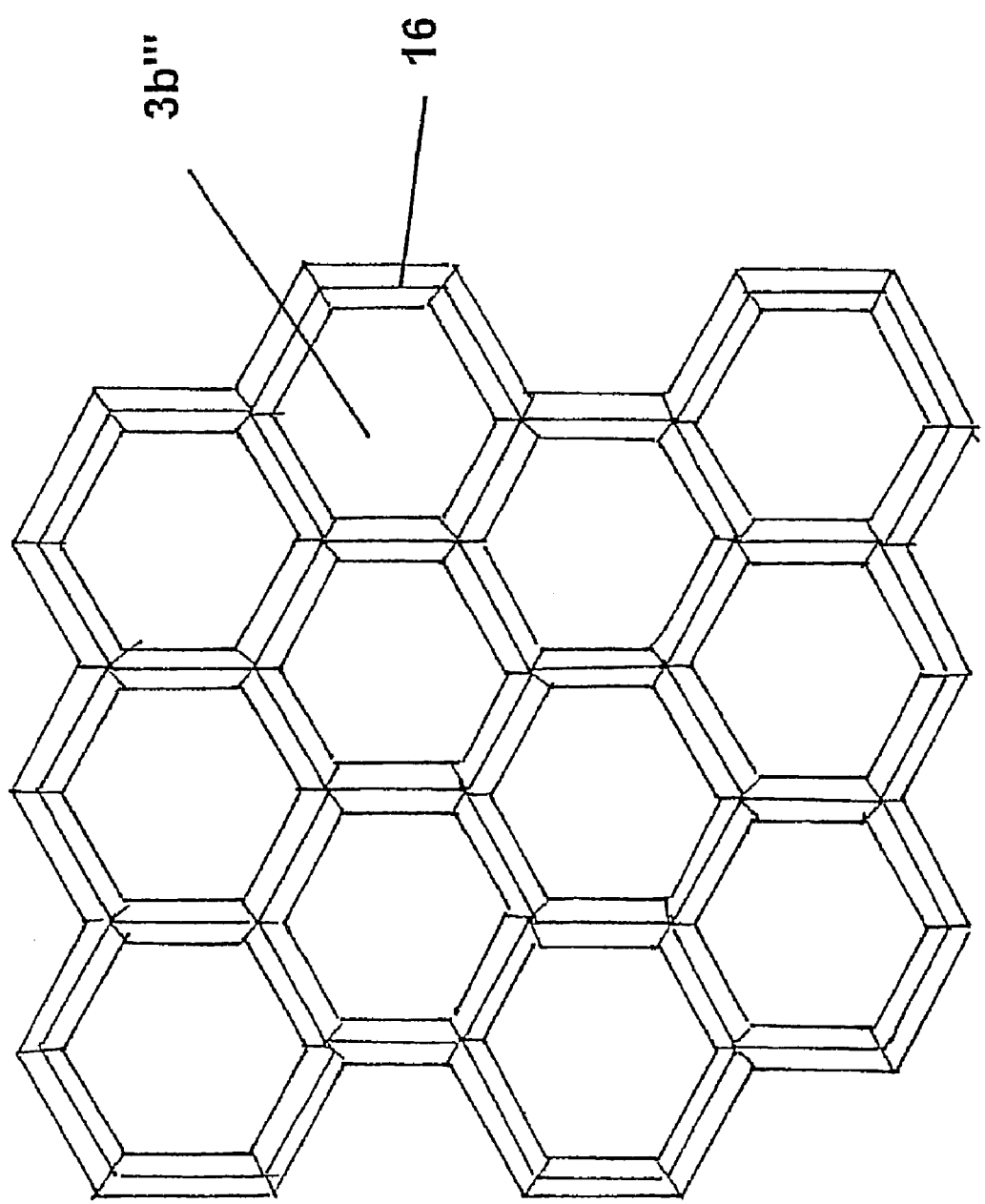

FIG. 5 shows a plan view of a wall 3*b''''*. Here, the rib structures are formed as honeycombs 16 bearing on one another. The honeycombs may also have a "chaotic" course since with the uniform arrangement in FIG. 5 acoustic problems arise under certain circumstances.

Figure 6:
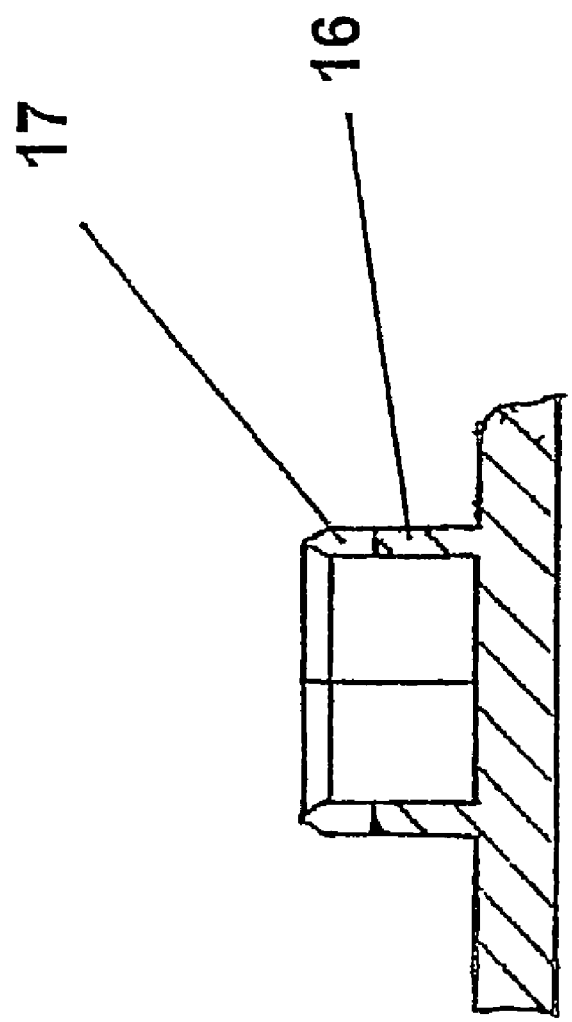

FIG. 6 shows a section through a honeycomb 16. Here recesses 17 are shown on the upper side of the honeycomb which provide for an improved distribution from honeycomb to honeycomb when foaming. The attachment on the upper side is above all advantageous for reasons of production technology. In principle however suitable recesses on the lower side of the honeycomb webs would also be possible.

Figure 7:
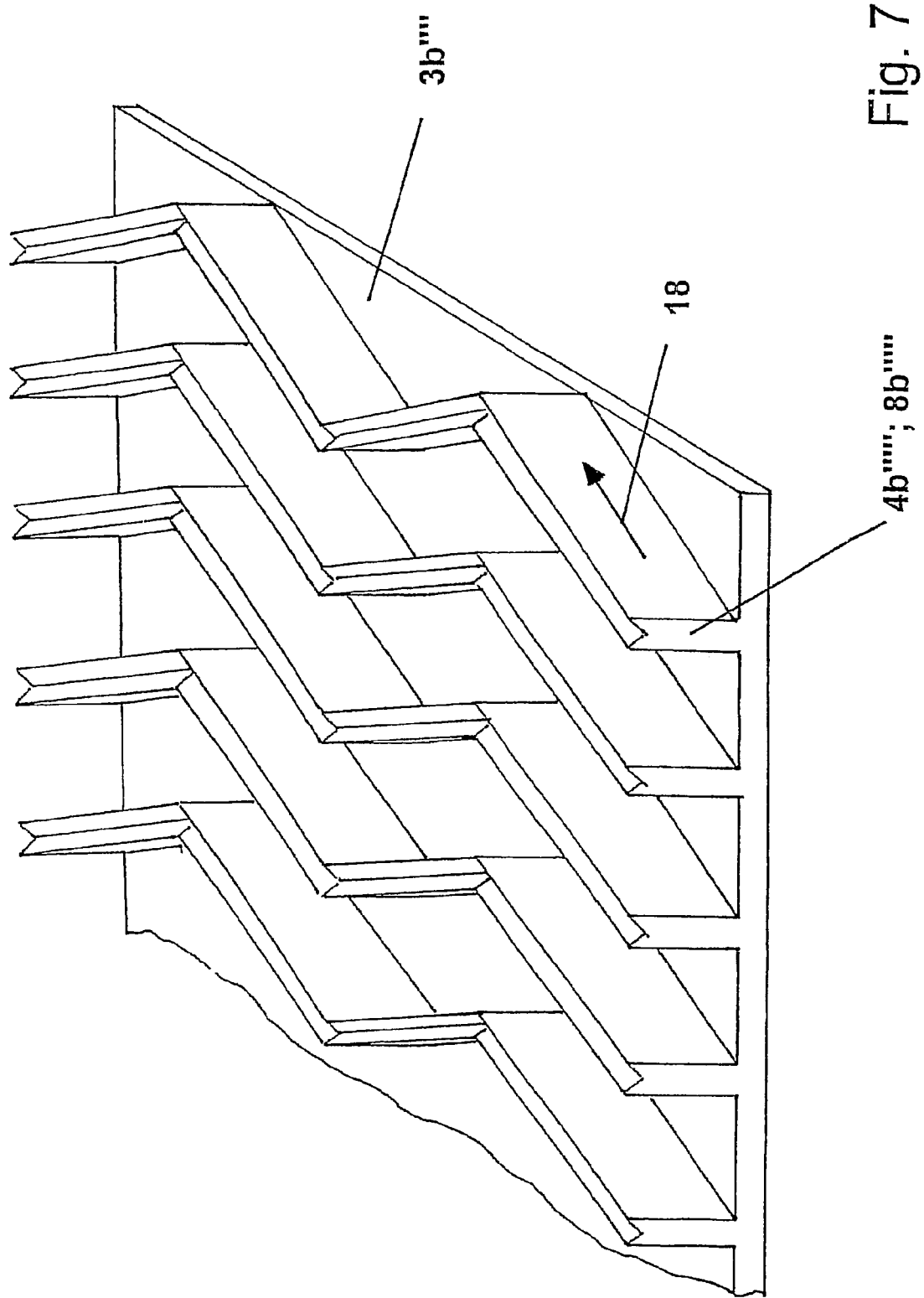

Finally FIG. 7 shows a further embodiment of a second wall $3b''''$. This comprises webs $4b''''$ of a rib structure $8b''''$ which are parallel to one another. These webs have a zigzag structure in the direction 18, thus in their running direction. This zigzag course which runs in the direction of a wall surface plane likewise ensures that an improved "push meshing" is given. Advantages with respect to bending are also achieved since the effective length of the webs in relation to the surface of the wall $3b''''$ is longer and therefore an improved geometrical moment of inertia is achieved which is particularly important with the bending in the case of a frontal crash.

Finally it is emphasised that in particular the sharp bend and curvature shapes of the webs shown in the FIGS. 4a to 4c as well as in FIG. 7 may also be applied to all other embodiments, in particular to the embodiments of FIG. 1a to 1c.

It is essential that the end wall module shown here offers an integrated very good sound insulation. Here however it is not the case of the construction of an end wall with an additional insulation arranged thereon. It is particularly important here that the insulation is already integrated. By way of this, in a manner which is different to additionally attached honeycomb structures, high shear forces may be accommodated on the outer side of the end wall, and therefore as a whole no very high total geometrical moment of inertia results. According to the present invention, in the case of a loading or crash, a hooking together of the two layers occurs (i.e. of the first and the second wall). Both walls in this case have a common force neutral axis lying between the individual layers, wherein an increased geometrical moment of inertia, caused by way of the increased distance of the individual wall to the force neutral axis (Steiner component). The advantage of this variant lies in the possible smaller dimensioning of the end wall, wherein the total mass of the system may be further reduced.

The invention claimed is:

1. An end wall module for a motor vehicle, wherein the end wall module comprises a first as well as a second wall distanced to this, characterised in that the first wall comprises a first rib structure and the second wall having a second rib structure, said first rib structure having an end surface complementary to an end surface of the second rib structure wherein the rib structures are formed such that in an undeformed condition of installation of the end wall module, the first and the second rib structure are distanced to one another, and in at least one deformed condition of the end wall module, first and second rib structures are engaged with one another and the complementary end surface of the first and second rib structures meet with a positive fit.

2. An end wall module according to claim 1, characterised in that installation components are arranged on at least one of the first and the second wall on the side which is distant to the respective other wall.

3. An end wall module according to claim 1, characterised in that at least one of foam is arranged and a cavity exists between the first and second wall.

4. An end wall module according to claim 1, characterised in that at least one of the first and second rib structure comprises webs.

5. An end wall module according to claim 4, characterised in that at least one of the first and second rib structure in each case comprises webs with an equal length in the direction of the respective other wall.

6. An end wall module according to claim 4, characterised in that the first and second rib structure in each case comprises webs with a different length in the direction of the respective other wall.

7. An end wall module according to claim 4, characterised in that between the webs of a rib structure, the distance is between 2 mm and 200 mm.

8. An end wall module according to claim 4 characterised in that the webs of the first rib structure at their ends pointing to the second rib structure have a convex or concave shape.

9. An end wall module according to claim 4, characterised in that the first rib structure comprises webs and the second rib structure comprises cavities for receiving these webs.

10. An end wall module according to claim 1, characterised in that the smallest gap width between the first and the second rib structure is between 0.5 mm and 5.0 mm.

11. An end wall module according to claim 1, characterised in that the second wall of the end wall module laterally projects beyond the first wall at least in regions.

12. An end wall module according to claim 11, characterised in that a surface area of the second wall on the side which is distant to the first wall has at least 10%, more surface area than the first wall on its side distant to the second wall.

13. An end wall module according to claim 11, characterised in that the second wall in the laterally projecting regions on its side distant to the first wall comprises an outer rib structure.

14. An end wall module according to claim 1, characterised in that at least one of the first-and second wall-and the rib structures is of plastic or metal.

15. Art end wall module according to claim 4, characterised in that the webs on their end faces which point to the respective opposite wall, in their running direction comprise curvatures and/or sharp bends.

16. A motor vehicle, containing an end wall module-according to one of the preceding claims.

17. A motor vehicle according to claim 16, characterised in that this contains a mounting for bordering an end wall module.

18. A motor vehicle according to claim 17, characterised in that the end wall module is screwed and/or bonded to the mounting for bordering.

* * * * *